Oct. 3, 1950 W. H. DEACY 2,524,593
METHOD OF FORMING LETTERS IN STONE
AND RESULTING PRODUCT
Filed April 7, 1948 2 Sheets-Sheet 1
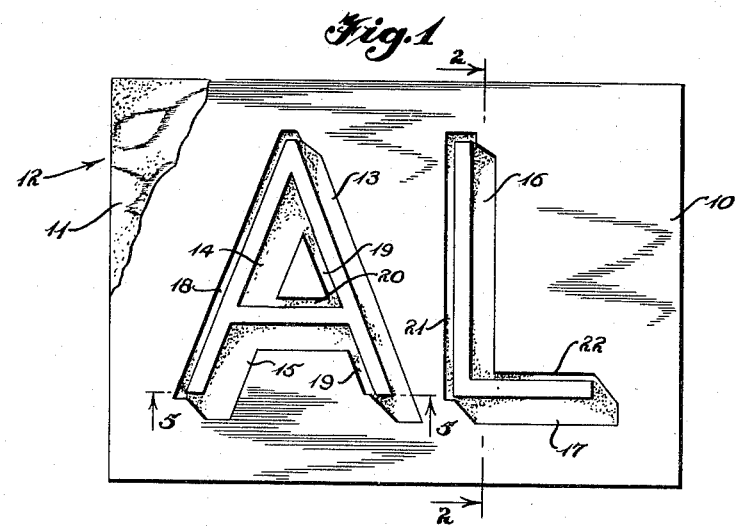
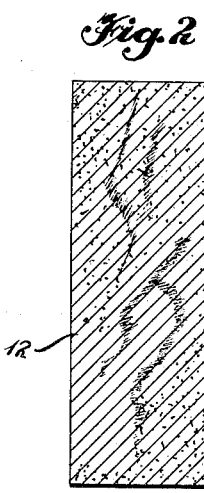
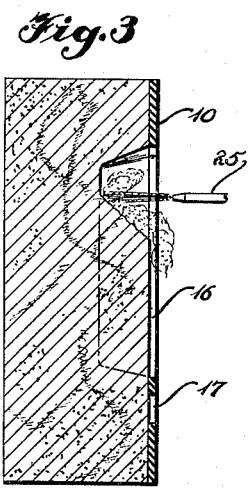
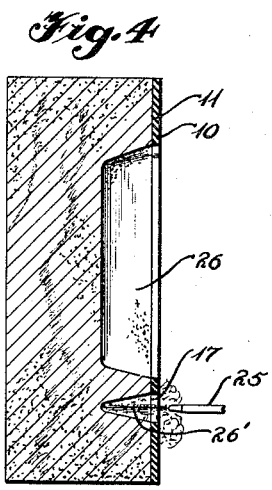
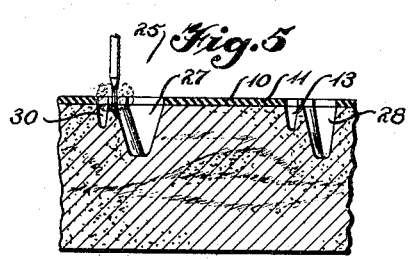
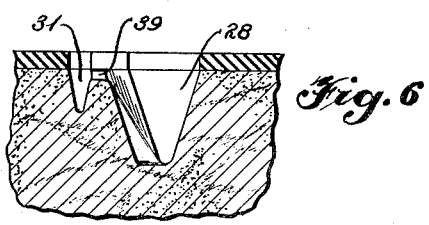
Inventor
William H. Deacy
By Cushman Darby Cushman
Attorneys Oct. 3, 1950   W. H. DEACY   2,524,593
METHOD OF FORMING LETTERS IN STONE
AND RESULTING PRODUCT
Filed April 7, 1948   2 Sheets-Sheet 2

Inventor
William H. Deacy
By Cushman Darby & Cushman
Attorney's

Patented Oct. 3, 1950

2,524,593

UNITED STATES PATENT OFFICE 2,524,593

METHOD OF FORMING LETTERS IN STONE AND RESULTING PRODUCT

William H. Deacy, New York, N. Y., assignor to Vermont Marble Company, Proctor, Vt., a corporation of Vermont Application April 7, 1948, Serial No. 19,557

3 Claims. (Cl. 41—39)

The present invention relates to a method of forming indicia on the surface of stone, to give the visual effect of raised figures, standing above the general surface, background plane or elevation, and to the resulting product. More particularly, the invention is concerned with creating the visual effect on the surface of stone blocks or slabs of raised letters and numerals, without actually producing letter bars or other elements projecting outwardly beyond the background.

The primary object of the invention is to provide a new and improved stone slab or block structure giving this effect of having raised letters thereon but in which substantially the entire surface lies in a single plane, or other continuous geometric surface, except for certain grooved lines or areas, delineating the letters.

Another object is to provide an improved method of producing on the surface of a stone slab or block, the visual effect of raised letters or other indicia, simply, cheaply, and expeditiously, by recessing or grooving the surface along predetermined delineated areas, in accordance with a novel plan or system.

Another object of the invention is to provide a new method of arranging grooves in the surface of a stone block or slab, to give the effect of letters standing up from the surface thereof.

A further object is to provide an improved method of marking stone and a resulting product which will have long lasting qualities and which will withstand weathering for longer periods than stone products marked with raised letters on the surfaces thereof.

Although not confined to such use, the invention has particular utility in the field of monumental stone work.

Other and further objects and advantages of the invention will be apparent from a consideration of the following description of a preferred method and a preferred embodiment of the resulting product, shown in the accompanying drawings, in which Figure 1 is a fragmentary plan view of a stone slab or block, having associated therewith means for delineating predetermined surface areas thereof, prior to the grooving operations.

Figure 2 is a section on line 2—2 of Figure 1;

Figures 3 and 4 are similar sections, illustrating subsequent steps in the method;

Figure 5 is a section substantially on line 5—5 of Figure 1;

Figure 6 is an enlarged section similar to Figure 5, showing the condition of the grooves at the conclusion of the sand blasting operation;

Figure 7:
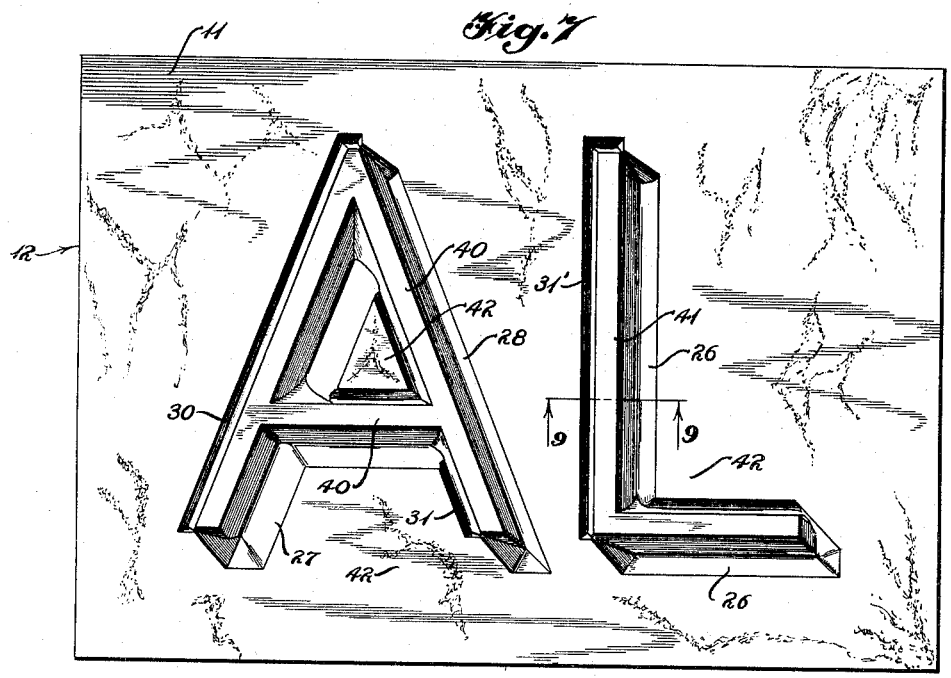
Figure 7 is an enlarged fragmentary plan view of the finished product, at the conclusion of the process.

In accordance with the present invention, the visual effect of letters raised from a continuous surface of a stone block or slab is produced by forming in the continuous surface, elongated grooves in areas corresponding to areas of shadow which would be cast on the surface of the stone by raised letters projecting outwardly therefrom and illuminated from a fixed source of illumination, preferably from an upper left-hand source, and also by relatively narrow grooves positioned on lines corresponding to the positions of those corner edges of such raised letters which would directly receive light from the same source. By forming grooves in this manner, the effect of raised letters is produced, although the areas corresponding to the front faces of the letters and the areas corresponding to the background are actually all in the same plane or in the same continuous geometric surface which, for instance, might be a somewhat curved surface.

A sheet of suitable material, such as rubber composition 10 is adhesively united to the face 11 of a stone slab 12. A plurality of lines are then traced from a master pattern upon the outer surface of the sheet and certain areas within the lines are cut out with a sharp knife and physically removed. As shown in Figure 1, this provides a stencil having relatively wide, elongated slots or openings 13, 14, and 15, positioned in areas corresponding to shadows which would be cast by the side bars of the raised letter A and by the cross-bar thereof. As a result of using a stencil formed in place on the stone and adhesively united to the surface thereof, the use of connecting webs or bridge pieces between parts of the stencil which are surrounded by slots is unnecessary.

If the letter L is to be associated with the letter A, the stencil sheet 10 has additional relatively wide, elongated openings 16 and 17 cut therein, positioned in the areas corresponding to the shadows cast by the vertical and horizontal legs of a raised letter L. In addition, the stencil is cut to provide elongated relatively narrow openings 18, 19, 20, 21, and 22, positioned along lines corresponding to the corner edges of the letter bars, facing the same upper left-hand source of illumination.

With a stencil so adhesively secured upon the stone, the surface of the stone within the delineated areas is removed, for instance by a sand blasting instrument indicated diagrammatically at 25. In many cases the stone is enclosed within a chest and the sand blast directed against its covered surface from a fixed source carried by a frame. The stencil confines the action of the blast of sand and air, and results in grooves having sharply defined edges. The grooves corresponding to the relatively wide shadow area openings 13—17 in the stencil, are relatively wide, as indicated at 26, 27, and 28, while the grooves corresponding to the illuminated corner edges, delineated by openings 18—22, are relatively narrow and are of less depth, as indicated at 30 and 31.

The invention, of course, is not limited to the use of a stencil or the equivalent for delineating the areas to be recessed or grooved. For instance, it is entirely feasible to mark on the surface of the stone, with a pencil or the like, the areas to be grooved. Then, a skilled artisan may remove the stone within the marked areas by any suitable implement, such as a fine sand blast, a stone cutting chisel, or power operated tools.

Figure 8:
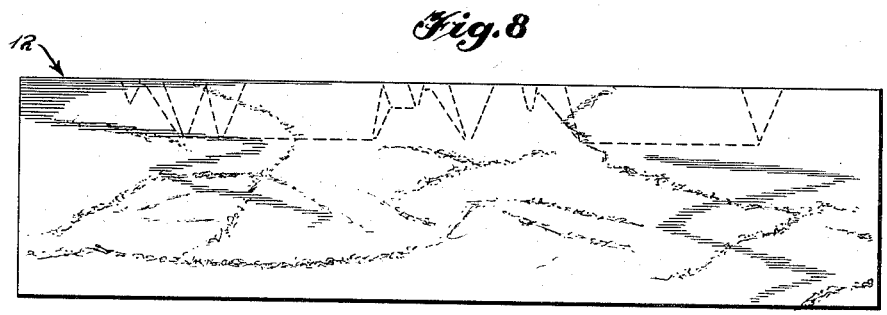
Figure 8 is an elevation of Figure 7, looking toward the lower edge thereof.
Figure 9:
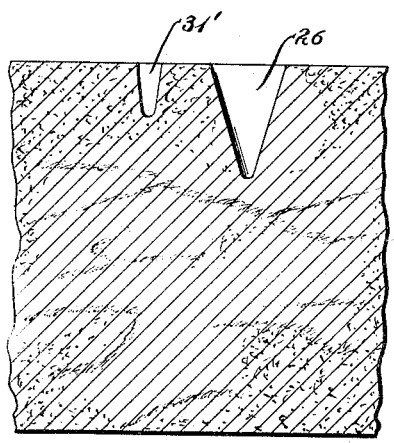
Figure 9 is an enlarged fragmentary section taken on line 9—9 of Figure 7.

As indicated in Figures 7, 8, and 9, the upper surface 11 of the block or slab 12 is continuous or coplanar throughout all portions thereof, except where the grooves are formed. In other words, the front faces 40 and 41 of the two letters are in the same geometric surface as the background portions 42, all of which, of course, are continuations of surface 11. The deep and wide shadow grooves 27 and 28 along the inclined legs of the letter A are generally V-shaped in cross-section, and the same is true of the deep and wide grooves 26 and 26' in areas corresponding to the areas of shadows which would be cast by the letter L. The illuminated corner edge grooves 30, 31, and 31' are narrower and of less depth, but perform the function of representing the edges of raised letters facing the source of light.

As a result of this construction, the wide and deep grooves, no matter how the stone is illuminated, appear darker than the adjacent and other surface portions thereof, thereby creating the illusion that the portions immediately adjacent thereto, corresponding to the faces of the letter, are raised. In addition, the narrow elongated grooves make a sharp contrast with the adjacent background and give the appearance of brightly illuminated front corner edges of raised letters. The combination of grooves of this type, positioned as described, produces most unusual and striking effects on the eye of an observer and results in a structure of marked utility.

The invention is not limited to the shape or design of letters shown in the accompanying drawings and described above, but includes any suitable form, size, or shape of letters, numerals, and other indicia. All modifications coming within the scope of the appended claims, as to method and resulting product, are intended to be included within the invention.

I claim:

1. A stone having a substantially continuous planar surface, said surface being configured to give the visual effect of raised letters or numbers standing above said surface but having no portions thereof projecting therebeyond, said letters being defined exclusively by elongated, relatively wide grooves positioned in areas coinciding with areas of shadow which would be cast on the surface by raised letters illuminated from a fixed source relative thereto and by elongated relatively narrow grooves positioned on lines corresponding to the positions of the corner edges of such raised letters which would directly receive light from said source, the surface of the stone on all sides of said grooves being co-planar.

2. A stone having a substantially continuous planar surface, said surface being configured to give the visual effect of raised letters or numbers standing above said surface but having no portions thereof projecting therebeyond, said letters being defined exclusively by elongated, relatively wide and relatively deep grooves positioned in areas coinciding with areas of shadow which would be cast on the surface by raised letters illuminated from a fixed source relative thereto and by elongated relatively narrow grooves of less depth than the first mentioned grooves, positioned on lines corresponding to the positions of the corner edges of such raised letters which would directly receive light from said source, the surface of the stone on all sides of said grooves being co-planar.

3. The method of forming, on a stone having a substantially continuous surface, letters giving the visual effect of raised letters standing above said surface, without forming on the surface any portions projecting beyond the general continuous elevation thereof, said method comprising delineating areas on the surface coinciding with areas of shadow which would be cast thereon by raised letters illuminated from a fixed source, delineating elongated relatively narrow areas on lines corresponding to the positions of the corner edges of such raised letters which would directly receive light from said source, and forming in said surface, grooves coinciding with the delineated areas, while leaving the adjacent surface portions of the slab or block corresponding both to the faces of the letters or numerals and to the background at their original elevation, the grooves in the first mentioned, shadow areas being wider and deeper than the grooves in the second mentioned, corner edge areas.

WILLIAM H. DEACY.

REFERENCES CITED

The following references are of record in the file of this patent:

UNITED STATES PATENTS

| Number | Name | Date |
|---|---|---|
| 1,720,568 | Philip | July 9, 1929 |
| 1,852,274 | Thurn | Apr. 5, 1932 |
| 2,016,600 | Gray | Oct. 8, 1935 |
| 2,327,019 | Chruma | Aug. 17, 1943 |

FOREIGN PATENTS

| Number | Country | Date |
|---|---|---|
| 420,837 | Great Britain | Dec. 10, 1934 |